(No Model.)

W. H. BOYDEN.
TWINE HOLDER.

No. 285,727. Patented Sept. 25, 1883.

WITNESSES:
Wm. L. Cook.
Joseph C. Borns

INVENTOR.
William H. Boyden
by Joseph A. Miller & Co.
Attys

N. PETERS, Photo-Lithographer, Washington, D. C.

United States Patent Office.

WILLIAM H. BOYDEN, OF PROVIDENCE, RHODE ISLAND, ASSIGNOR OF ONE-HALF TO GEORGE E. BOYDEN, OF SAME PLACE.

TWINE-HOLDER.

SPECIFICATION forming part of Letters Patent No. 285,727, dated September 25, 1883.

Application filed March 15, 1883. (No model.)

*To all whom it may concern:*

Be it known that I, WILLIAM H. BOYDEN, of the city and county of Providence, and State of Rhode Island, have invented a new and useful Improvement in Twine-Holders; and I hereby declare the following to be a full, clear, and exact description of the same, reference being had to the accompanying drawings, forming part of this specification.

This invention has reference to an improvement in receptacles for twine and cord used for tying parcels; and it consists in the peculiar and novel construction of the holder and the automatic tension device, as will be more fully set forth hereinafter.

Figure 1:
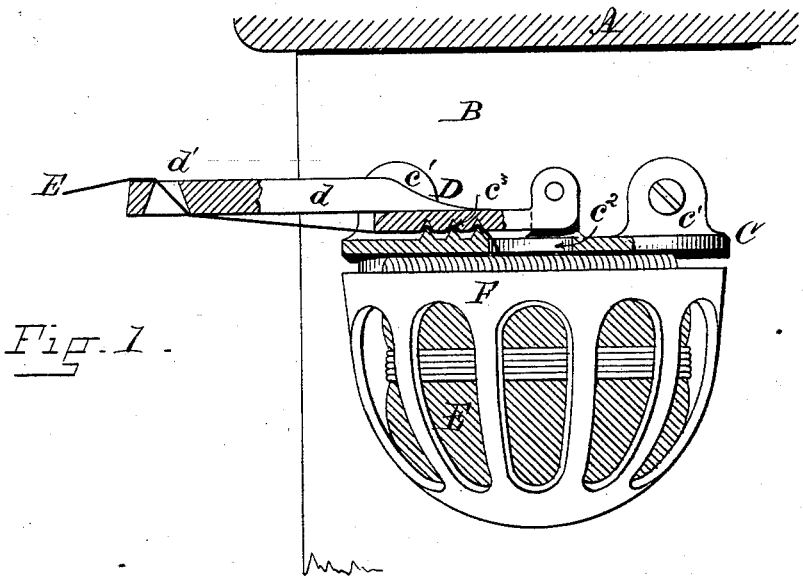
Figure 2:
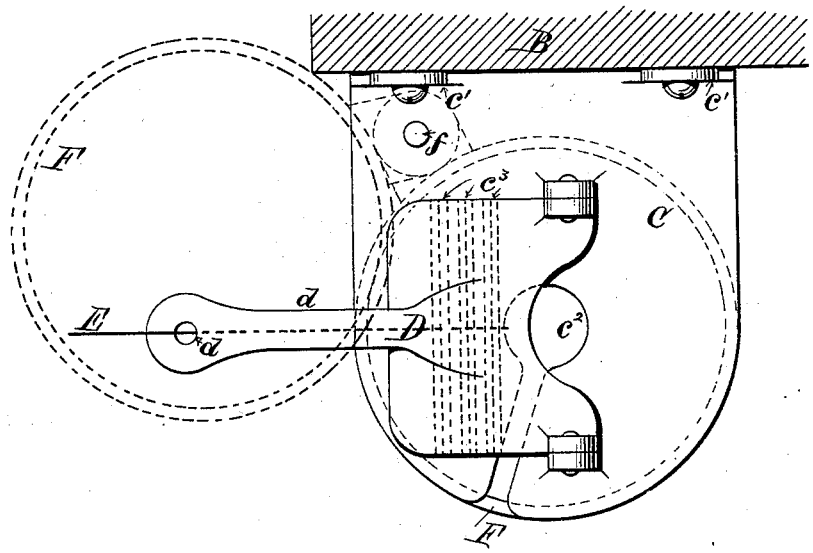

Figure 1 is a view, partly in section, of my improved twine-holder, showing the same secured underneath the counter. Fig. 2 is a top view of the same, the basket being shown in broken lines in the position when the same is in use, and also in the position occupied when the ball of twine is to be inserted.

In the drawings, A is the table of an ordinary counter such as used in stores.

B is a partition supporting the table A. Against this partition the twine-holder is secured.

C is a plate provided with the ears $c'$ $c'$, by which it is secured to the partition and held so as to extend horizontally. The plate C is also provided with the central hole, $c^2$, from which the slit $c^4$ may extend to the periphery, as shown in Fig. 2, so as to facilitate the entering of the twine.

Hinged to the plate C is the tension device D, which rests on the plate C, both the plate and the hinged tension device being provided with ridges $c^3$, so that the twine has to pass under and over these ridges, thus restraining its passage unless the tension-plate is raised. Extending from the hinged tension-plate D is the arm $d$, provided with the hole $d'$, through which the twine E is passed.

F is the basket in which the ball of twine is placed. This basket is pivotally secured to the plate C by the pivot $f$, so that the basket can be swung out from under the plate C and the ball of twine can be inserted.

The operation of the device is as follows: The basket F is swung out from under the plate C, as is shown in Fig. 2, the ball of twine is inserted, and the end passed through the hole $c^2$; or, when the slit $c^4$ is used, it is passed through the slit $c^4$ until it enters the hole $c^2$, the hinged tension-plate is raised, and the twine passed through the hole $d'$. On releasing the tension-plate the same will bear on the twine and hold it between the ridges $c^3$. When, now, the twine is used for tying a parcel, the strain on the twine will raise the arm $d$, and with it the tension-plate D, thus allowing the twine to pass freely from the basket, all the strain being the friction in the hole $d'$. When, now, the twine is cut or broken, the strain on the twine is instantly released, the friction-plate D falls on the plate C, and holds the twine between the ridges $c^3$, the end hanging from the end of the arm $d$. As this arm $d$ projects beyond the plate C and basket F, the end of the twine can always be easily found by the hand. Thus the loss of time, the nervousness, and vexation produced by hunting for the end of a ball of twine, which are the characteristic of most twine-holders, are prevented, as under no conditions can the end of the twine slide back into the holder, but will be always found suspended from the arm $d$.

In place of securing the plate C to the side of a partition, the same may be supported on a stand, and can then be set into any desired place. The peculiar tension device may be used on twine-holders of the old construction, in which the twine is placed within a shell and drawn from a hole.

Having thus described my invention, I claim as new and desire to secure by Letters Patent—

1. In a twine-holder, the combination, with the plate C, provided with the hole $c^2$, and constructed to be secured to extend horizontally, of the hinged tension-plate D, provided with the arm $d$ and the ridges $c^3$, and the pivotally-suspended basket F, constructed to retain the twine when released, as described.

2. In a twine-holder, the combination, with the receptacle for holding the twine, and the aperture through which it is drawn, of the hinged plate D, provided with the ridges $c^3$, and the arm $d$, provided with the hole $d'$, constructed to be raised by the strain on the twine and hold the twine when released, as described.

3. The combination, with a twine-holder, of a hinged tension device constructed to be raised when the twine is drawn out, and to hold the twine by its weight bearing on the same when released, as described.

WILLIAM H. BOYDEN.

Witnesses:
J. C. BOMS,
J. A. MILLER, Jr.